(12) United States Patent
Rahbar-Dehghan

(10) Patent No.: US 9,791,693 B2
(45) Date of Patent: Oct. 17, 2017

(54) SENSOR GUARD FOR USING INTERNAL LENS CLEANING BULB BLOWER ON DIGITAL REFLEX CAMERA, AND METHOD OF USE THEREOF

(71) Applicant: 1317442 ALBERTA LTD., Canmore, Alberta (CA)

(72) Inventor: Fariborz Rahbar-Dehghan, Canmore (CA)

(73) Assignee: 1317442 ALBERTA LTD., Canmore, Alberta (CA)

( * ) Notice: Subject to any disclaimer, the term of this patent is extended or adjusted under 35 U.S.C. 154(b) by 0 days.

(21) Appl. No.: 14/902,857

(22) PCT Filed: Jul. 7, 2014

(86) PCT No.: PCT/CA2014/000550
§ 371 (c)(1),
(2) Date: Jan. 5, 2016

(87) PCT Pub. No.: WO2015/013801
PCT Pub. Date: Feb. 5, 2015

(65) Prior Publication Data
US 2016/0202474 A1    Jul. 14, 2016

Related U.S. Application Data

(60) Provisional application No. 61/860,535, filed on Jul. 31, 2013.

(51) Int. Cl.
*G02B 27/00* (2006.01)
*B08B 5/02* (2006.01)
*G03B 17/56* (2006.01)

(52) U.S. Cl.
CPC ............ *G02B 27/0006* (2013.01); *B08B 5/02* (2013.01); *G03B 17/568* (2013.01)

(58) Field of Classification Search
CPC ...... G03B 17/568; B08B 5/02; G02B 27/0006
(Continued)

(56) References Cited

U.S. PATENT DOCUMENTS

| 6,490,746 B1 * | 12/2002 | Ernst | ........................ B08B 5/02 15/1.51 |
| 7,499,639 B2 * | 3/2009 | Kawai | .................... H04N 5/217 348/818 |

(Continued)

FOREIGN PATENT DOCUMENTS

| CA | 2639722 A1 | 3/2010 | |
| CA | 2741699 A1 | 5/2010 | |
| JP | 2008000700 A * | 1/2008 | ............... B08B 5/02 |

*Primary Examiner* — Frank Font
(74) *Attorney, Agent, or Firm* — Shumaker, Loop & Kendrick, LLP; James D. Miller

(57) ABSTRACT

A cleaning apparatus for removing dust from lens surfaces inside a camera inner chamber, comprising: a bulb blower, a retainer is defined with a planar annular section, for fitting over a bayonet mount ring from the camera, a frusto-conical bottomless cup sized such that the blower nozzle outlet tip and main body are releasably engaged therethrough and the nozzle inlet seat releasably lockingly abuts thereagainst, and omnidirectional spring loaded connectors spacedly interconnecting the annular section to the cup, enabling the cup to move from a first position, at rest spacedly away from the plane of the retainer annular section, to a second position about the annular section plane. the nozzle outlet tip is progressively movable through the plane of the annular section against the bias of the connectors.

8 Claims, 12 Drawing Sheets

(58) Field of Classification Search
USPC ........ 359/507, 509, 511, 809, 896; 396/429, 396/544, 619, 661
See application file for complete search history.

(56) References Cited

U.S. PATENT DOCUMENTS

| | | | |
|---|---|---|---|
| 7,580,628 B2 * | 8/2009 | Ide | G02B 27/0006 348/335 |
| 8,548,318 B2 * | 10/2013 | Kawai | H04N 5/2254 15/94 |
| 2004/0200027 A1 | 10/2004 | Sugihara | |
| 2007/0110431 A1 * | 5/2007 | Worthington | B08B 5/02 396/429 |
| 2007/0151066 A1 * | 7/2007 | Seo | G03B 17/56 15/301 |
| 2007/0157402 A1 * | 7/2007 | Caffarella | H05F 3/06 15/1.51 |
| 2008/0205878 A1 * | 8/2008 | Owashi | B08B 5/04 396/429 |
| 2009/0313845 A1 * | 12/2009 | Koh | G03B 17/568 34/90 |
| 2011/0068197 A1 * | 3/2011 | Shen | A47L 25/00 239/327 |
| 2011/0197930 A1 * | 8/2011 | Rahbar-Dehghan | B08B 5/02 134/34 |
| 2012/0204909 A1 * | 8/2012 | Arjomand | A47L 25/00 134/37 |

* cited by examiner

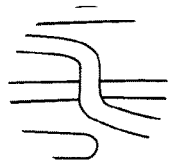
Fig. 7
Fig. 5
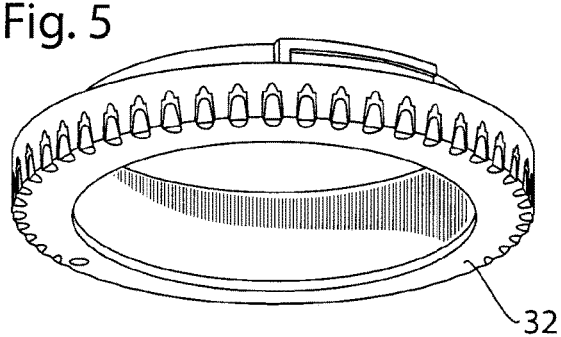
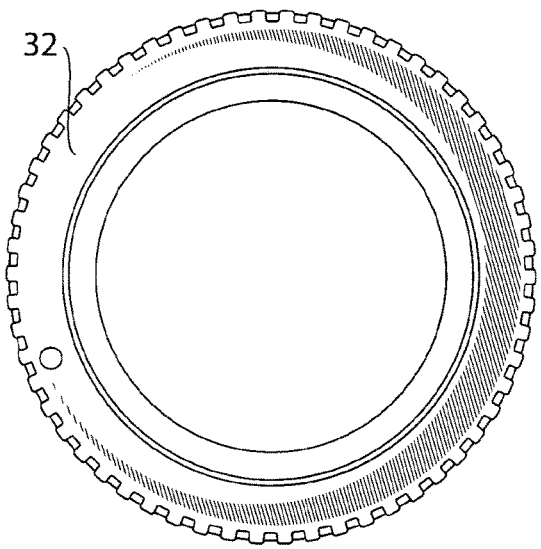
Fig. 6

SENSOR GUARD FOR USING INTERNAL LENS CLEANING BULB BLOWER ON DIGITAL REFLEX CAMERA, AND METHOD OF USE THEREOF

CROSS-REFERENCE DATA

The present application claims conventional priority of American provisional application No. 61/860,535 filed Jul. 31, 2013.

BACKGROUND OF THE INVENTION

Components of digital reflex cameras are expensive and fragile, in particular lenses and mirrors inside the camera inner chamber located between the front standard lens and the rear pressure plate on the camera body hinge access door. Sensor surfaces inside such camera's chamber needs to be periodically cleaned. Usually, such cleaning is performed with the camera supported over ground, with the recess of the camera inner chamber facing downwardly so that dust that is removed be able to fall downwardly under gravity from the chamber recess. In such an environment, the camera lens chamber has dark corner areas that are difficult to see clearly because ambient light has limited access therein. Therefore, it is a current problem to properly clean the whole volume of the camera sensor chamber, while avoiding accidental damage to fragile components thereof. Moreover, due to the shifting demographic environment, another problem is that older users become frail and/or suffer from neuromuscular degenerative diseases such as Parkinson disease, and their dexterity will become compromised, thus increasing the hazards of accidentally damaging expensive fragile camera components during self-cleaning operations.

SUMMARY OF THE INVENTION

The invention relates to a cleaning apparatus for removing dust from lens surfaces inside a camera inner chamber, said cleaning apparatus comprising: a bulb blower device defining a nozzle having a main body with opposite inlet and outlet tip, said nozzle inlet diametrally larger than said nozzle main body and outlet tip so as to define a seat, a compressible resilient bulb member having an air intake port and an air outlet, and coupling means operating coupling said nozzle inlet to said bulb member outlet; and a retention member, defining a planar annular section, for fitting over a bayonet mount ring from the camera, frusto-conical cup means sized such that said nozzle outlet tip and main body are releasably engaged therethrough but said nozzle inlet seat releasably lockingly abuts thereagainst, and omnidirectional spring loaded connector means spacedly interconnecting said annular section to said cup means, enabling said cup means to move from a first position, at rest spacedly away from the plane of said retention member planar annular section, to a second position about said plane of retention member annular section; wherein said nozzle main body defines a length of such a size that said nozzle outlet tip is progressively movable towards and through and beyond and transversely across the plane of said retention member annular section against the bias of said spring loaded connector means, for enabling said nozzle outlet tip to access progressively further into the camera inner chamber yet sustaining progressively increasing spring back forces.

In one embodiment of the invention, said connector means forms a hemispherical shape spring-loaded elastomeric sheet forming a diametrally largest annular edge, said annular section integral to said sheet annular edge, and said cup means consisting of a selected one through bore from a plurality of through bores made on said elastomeric sheet, said elastomeric sheet partly collapsible under outwardly applied load but automatically returning to its hemispheric shape under bias of its said spring bias.

In an alternate embodiment, said connector means consists of a semi-flexible spring-loaded wire spiralling into an hemispherical shape open wire cone, said wire defining an elbowed inner end at a diametrally largest edge of said wire dome for releasable interlocking with the camera lens bayonet mount ring, said cup means integrally mounted to a diametrally smallest apex of said wire cone opposite said largest edge thereof. Said cup means could consist for example of one frusto-conical extension of said wire having two sections: a diametrally larger outer well and a diametrally smaller inner base. Said wire could be coated by a non-conductive soft plastic material sheath of a type enabling prevention of accidental wire short circuiting.

In still another embodiment of the invention, said connector means comprises: a rigid second ring, a number of support legs having one and another opposite ends and fixedly transversely connected at said one end to said second ring, anchor means for anchoring said second ring another end to said camera lens bayonet mount ring, and at least three spaced spring members having one and another opposite ends with said spring members one end anchored to peripherally spaced sections of said second ring and with said spring members radially inwardly projecting from said second ring, said cup means integral to and joining said spring members another ends. Said cup means could then consist of a conical bottomless cup defining a diametrally larger top mouth facing a plane intersecting said second ring and a diametrally smaller bottom mouth facing a plane intersecting said support leg another ends.

The invention also relates to a method of use of camera with a cleaning apparatus of a type as in claim 1, comprising the following steps:

a) turning the camera upside down to bring its inner rear chamber facing downwardly;

b) engaging said nozzle main body through said cup means;

c) applying forcible biasing pressure on said nozzle inlet seat into said cup means and with concurrent progressive inward displacement of said cup means against the bias of said connector means, from said first position to said second position thereof;

d) bringing said nozzle outlet tip inwardly to such a position closely spacedly registering with a lens section of the camera inner chamber to be cleaned;

e) compressing said resilient bulb member with concurrent air outflow into said nozzle main body and through and outwardly from said nozzle air outlet; and f) releasing said forcible biasing pressure of step b) with concurrent spring back return of said cup means towards said second position thereof.

BRIEF DESCRIPTION OF THE DRAWINGS

In the annexed drawings:

FIGS. 5 and 6 are perspective and plan views respectively of the camera lens bayonet mount ring;

FIG. 7 is an enlarged view taken within ellipse 7 of FIG. 4;

DETAILED DESCRIPTION OF THE EMBODIMENTS OF THE INVENTION

Figure 1:
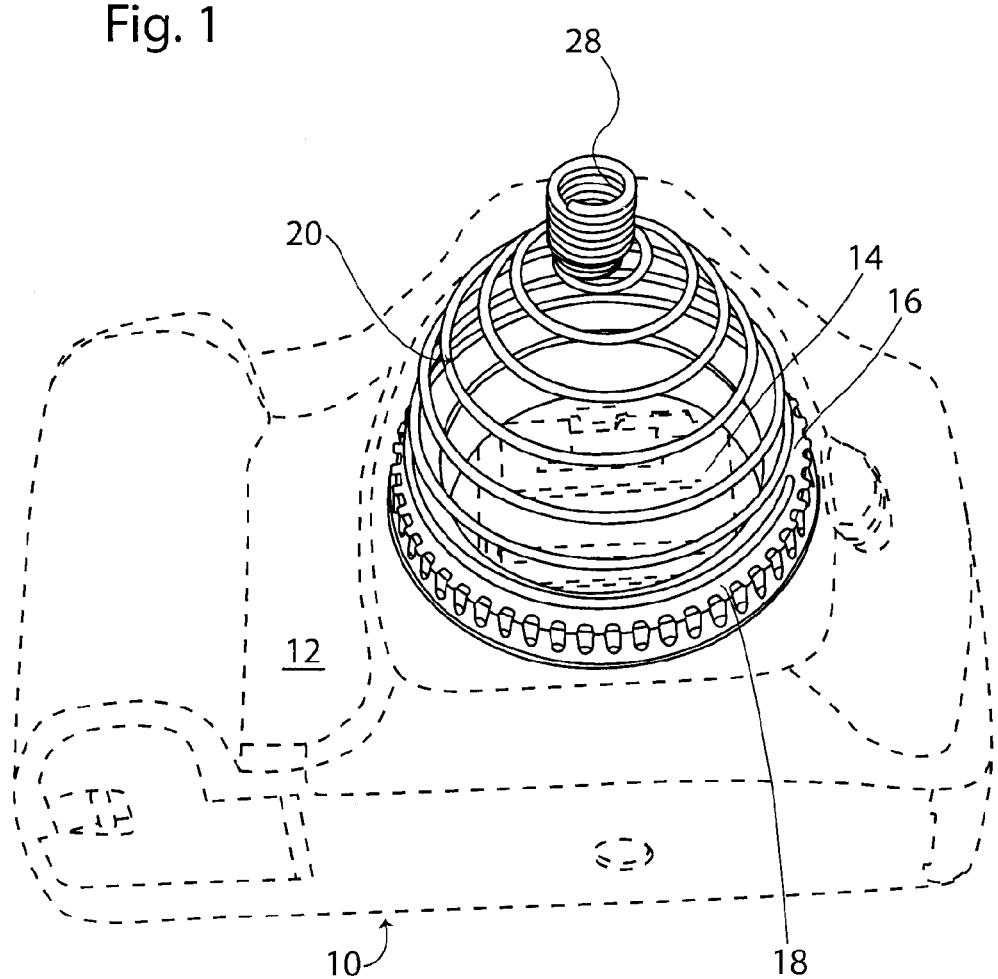
FIG. 1 is a perspective view of a digital camera with the camera standard lens removed and with the lens camera bayonet mount ring being fitted with a first embodiment of outwardly projecting sensor guard.
Figure 2:
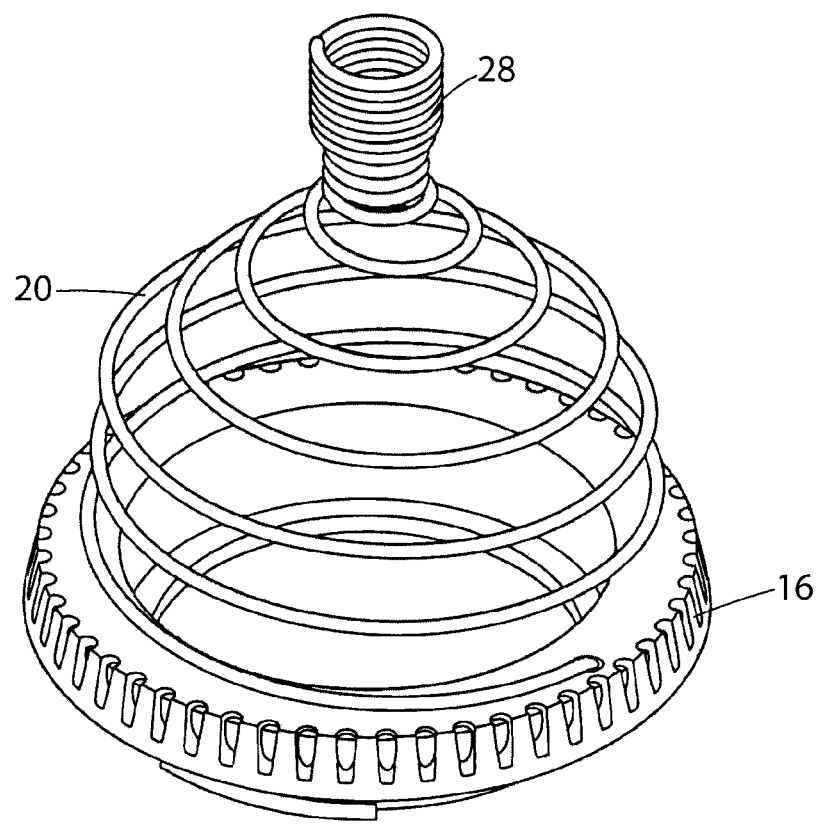
FIGS. 2 and 3 are a perspective view and an elevational view of the sensor guard and attached camera lens bayonet mount ring of FIG. 1, with the digital camera removed.
Figure 3:
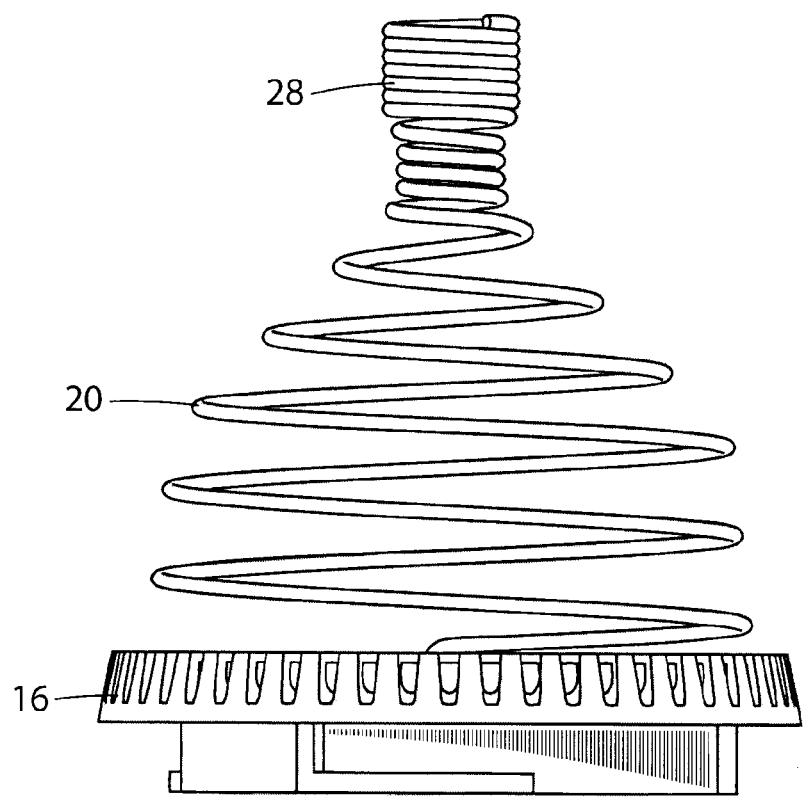
Figure 4:
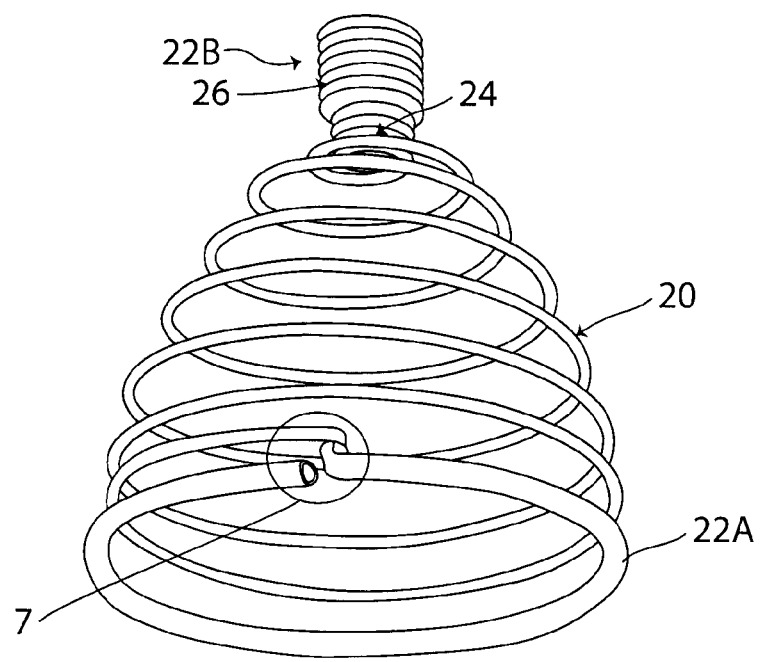
FIG. 4 is a perspective view of the sensor guard of FIG. 1, with the camera and cameral lens bayonet mount ring removed, showing how the bottom wire leg of this spiral spring base is made to be fully flat.
Figure 8:
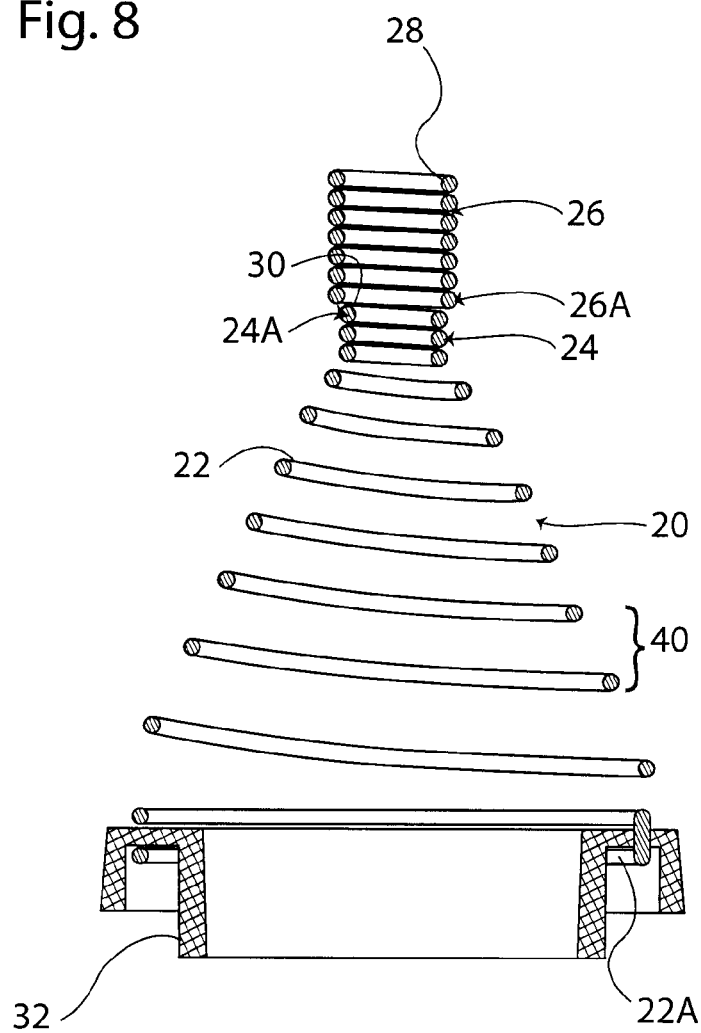
FIGS. 8 and 9 are longitudinal sectional views of the first and of a second embodiment respectively of sensor guard.
Figure 9:
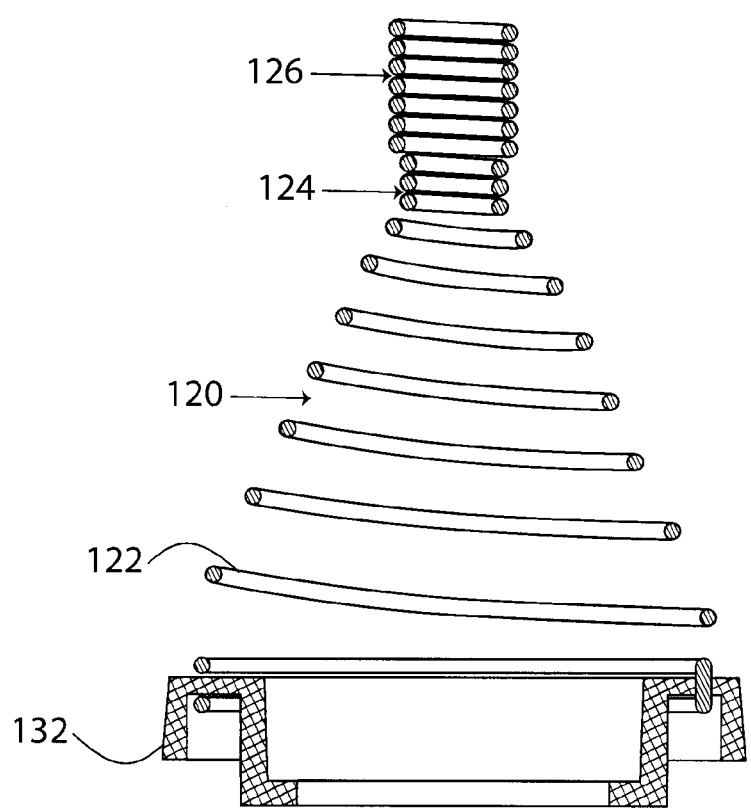

In FIG. 1, there is disclosed a digital reflex type camera 10 with the front standard lens removed and defining a main frame 12 with a camera lens inner chamber 14 accessible through a rear aperture 16. An exposed metallic ring 18 fixedly surrounds aperture 16.

As illustrated in FIGS. 1 to 9, according to the first two embodiments of the invention, there is provided an open generally hemispheric sensor guard 20, 120. In the first embodiment of FIGS. 1 to 8, guard 20 is formed by a conical spiralling wire 22, defining a diametrally widest bottom annular wire segment 22A sized and shaped to fit flatly over camera lens bayonet mount ring 18, and a top diametrally smaller apex section 22B. Wire top apex section 22B is of frusto-conical shape, defining a diametrally smaller inner section 24, and a diametrally larger tubular outer section 26, each wire sections 24, 26, consisting of at least a few spirals of wire 22. Outer apex wire section 26 forms a top free end exposed mouth 28, opposite inner wire section 24. Diametrally large outer wire section 26 is diametrally larger than wire inner section, but diametrally smaller than bottom wire segment 22A. An annular seat 30 is formed between the top exposed wire segment 24A of apex inner section 24 and the bottom wire segment 26A of apex outer section 26. An annular bracket 32 (or 132), is fitted to the widest bottom wire segment 26A, and sized and shaped for complementary releasable interlock with Nikon and Canon trademark cameras, respectively. The wire 122 of the second embodiment 120 has the same general properties as the wire 22 of the first embodiment 20, and corresponding elements are under the 100 series.

Figure 15:
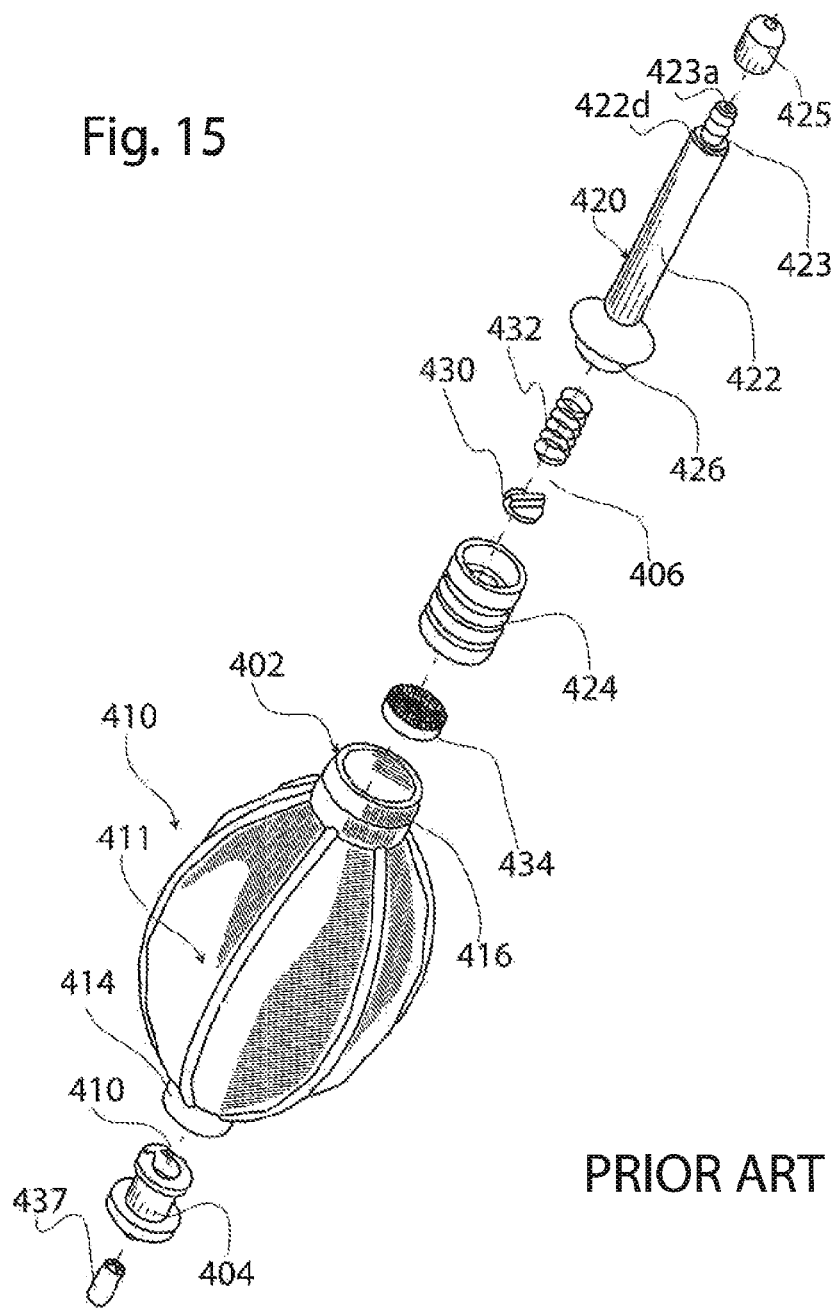
FIG. 15 is an exploded perspective view of an air bulb blower for use with the present sensor guard.

Wire 22 (122) is made from a compressible semi-flexible metallic wire, having spring-loaded memory shape properties. That is to say, hemispheric guard 20 can be deformed and partially collapsed by pushing frusto-conical top apex wire section 22B inwardly toward widest wire segment 22A, against the inherent spring-loaded bias of the hemispheric shape guard 20, but will resume its natural unbiased dome-shape upon release of said push load onto the frusto-conical apex wire section 22B. Guard deformation and partial guard collapse will occur either under an axial pushing load, orthogonal to the successive planes of the spiralling wires, or under a slight acute angular bias relative thereto. The top apex diametrally larger wire section 26 is sized and shaped to be freely engageable through mouth 28 by the rigid tubular body 120 of a nozzle 122 from a manually operated dust blower 410 (FIG. 15 of the drawings), such as the one disclosed in applicant's U.S. patent application published Aug. 18, 2011 under publication No 2011 019 7930. In this published application, a bulb cleaner is provided for removing dust from digital camera sensors. The cleaner comprises a compressible yet resilient manually actuatable bulb body 411 defining a deformable wall circumscribing an air enclosure. The bulb wall has an air outlet 416 enabling air outflow from the bulb air enclosure toward ambient air when the bulb is squeezed and becomes deformed. The bulb wall also has an air intake 414 enabling ambient air inflow into the bulb air enclosure. A releasable first one-way valve 404 mounted at the air intake, controls air inflow from ambient air towards the bulb enclosure. A releasable second one-way valve 424 mounted at a tubular nozzle inner end portion controls air outflow from the bulb air enclosure toward ambient air. Nozzle 420 is mounted at its inner end 426 to the bulb air outlet 416, and a nozzle nipple 425 is mounted at the nozzle outer end 423. The nozzle nipple 425 is sized and shaped to abut against wire seat 30, while a fraction of the nozzle main body 422 extends freely into the hollow of top diametrally larger wire section 26 of frusto-conical wire portion 22B of hemispheric guard 20. Nozzle 422 is positively prevented from going through frusto-conical wire section 22B, since nozzle nipple 425 abuts firmly against annular seat 30.

In use, bracket 32 is secured to camera ring 18, camera is turned upside down so that its lens chamber 14 face down (for dust outflow under gravity during cleaning), and nozzle 420 is engaged into top exposed wire cavity 28 of the sensor guard 20. By pushing the bulb body 411 toward the camera inner chamber 14, the hemispheric spiralling wire 20 is compressed wherein the spiralling wire spread or gap 40 (FIG. 2) is reduced, thus bringing frusto-conical wire section 22B closer to camera ring 18 and thus air outlet nozzle nipple 425 closer to the camera inner lens chamber 14, and not excluding slightly penetrating thereinto. Smaller tubular wire sections 24, 26, will then be allowed to tilt relative to the larger conical main sensor guard body 20, as the user tilts the nozzle 120 within the frusto-conical wire cavity 28, so as to direct air outflow from nozzle nipple 125 to various hard to reach corner sections inside the cameral inner lens chamber 14. Likelihood of damage hazards to fragile components of the camera inner chamber 14 is minimized, because of the constant spring-back load inherent to the deformed dome shaped sensor guard 20, with this spring back load increasing as the nozzle nipple 425 gets closer and closer to the plane of the camera ring 18.

In one embodiment, the metallic wire 22 (122), is coated by a soft plastic material, such coating for protecting the camera inner chamber components against accidental damage.

Figure 10:
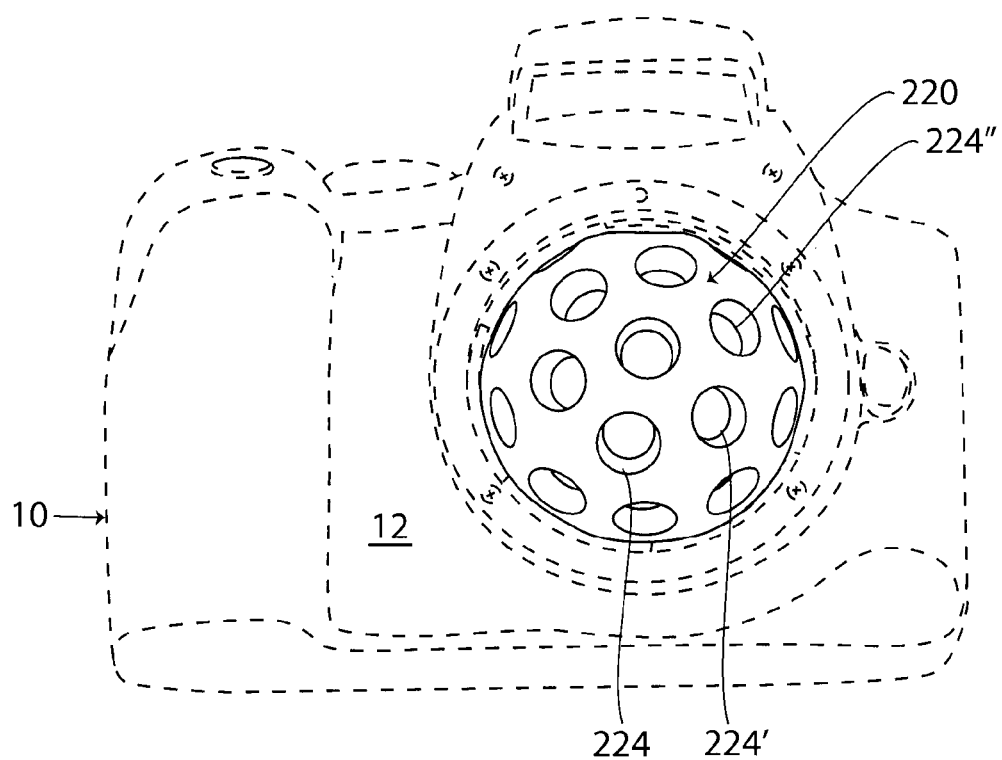
FIG. 10 is a view similar to FIG. 1, but showing a third embodiment of sensor guard according to the invention.
Figure 11:
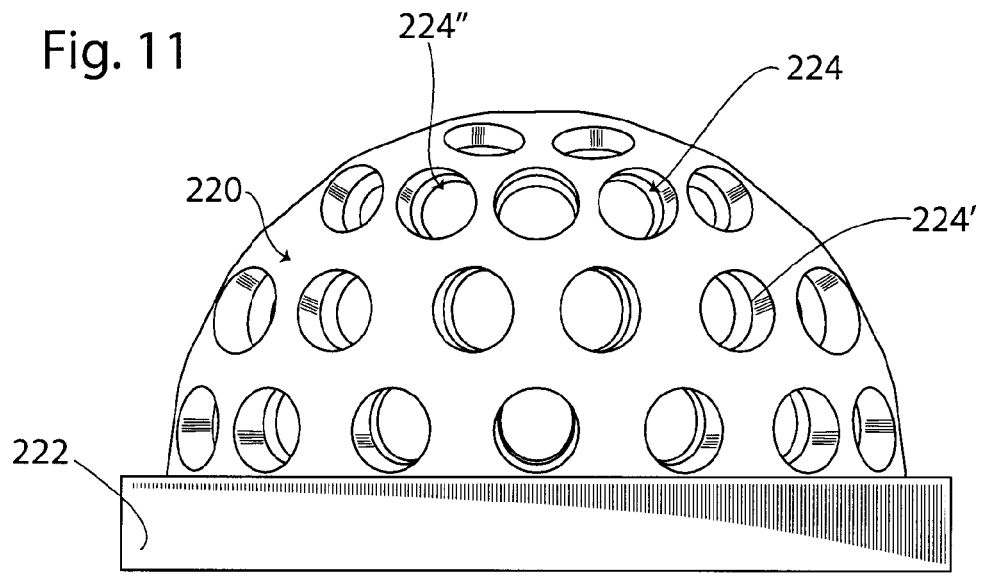
FIG. 11 is an elevational view of the sensor guard of FIG. 10.
Figure 12:
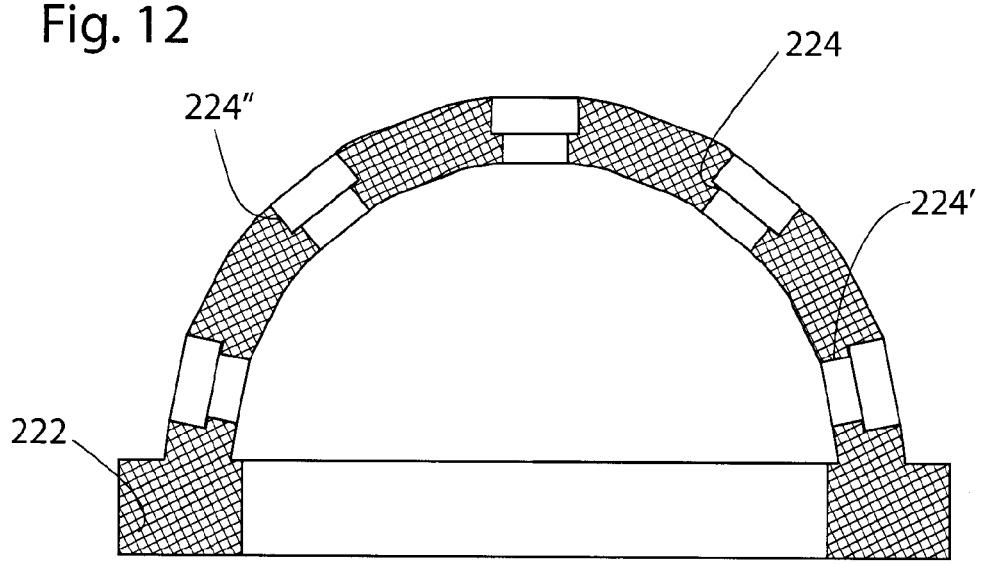
FIG. 12 is a longitudinal sectional view of the sensor guard embodiment of FIG. 11.

In the alternate embodiment of FIGS. 10 to 12, there is provided a semi-flexible elastomeric spring-back hemispheric guard 220. Elastomeric dome 220 includes an enlarged diametrally larger radially outturned flange 222, and a plurality of frusto-conical bores 224, 224', 224", . . . made in the hemispheric wall of guard 220. Each frusto-conical through bore 224 is sized and shaped to accommodate nozzle 420 and nipple 425 in the same general way as frusto-conical section 22B accommodated same. In use, by manually engaging nozzle 420 into a selected one of the frusto-conical bores 224, and by compressing the bulb body 411 for air escape through the nozzle nipple 425 and pushing the nozzle 420 inwardly thereby deforming and partly collapsing the elastomeric wall 220, the nozzle nipple 425 is brought closer to the plane of the camera ring 18. Again, likelihood of damage hazards to fragile components of the camera inner chamber 14 is minimized, because of the constant spring-back load inherent to the deformed dome shaped sensor guard 220, with this spring back load increasing as the nozzle nipple 425 gets closer and closer to the plane of the camera ring 18.

Figure 13:
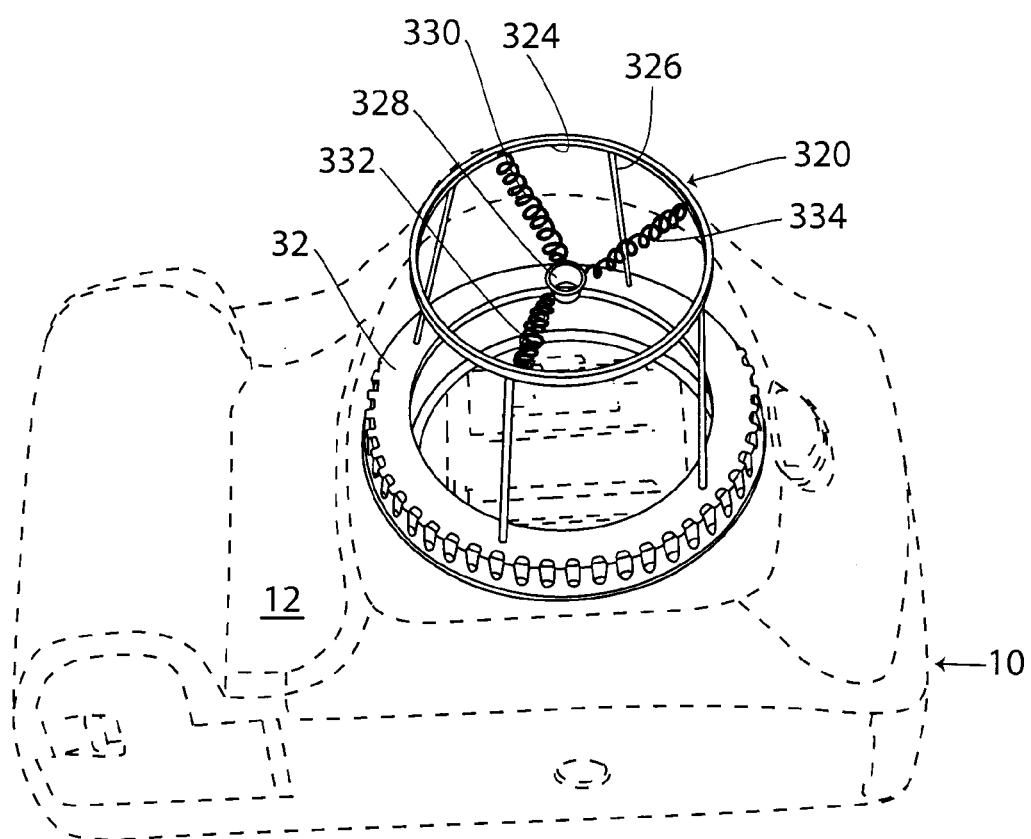
FIG. 13 is a view similar to FIG. 1 but showing a fourth embodiment of sensor guard.
Figure 14:
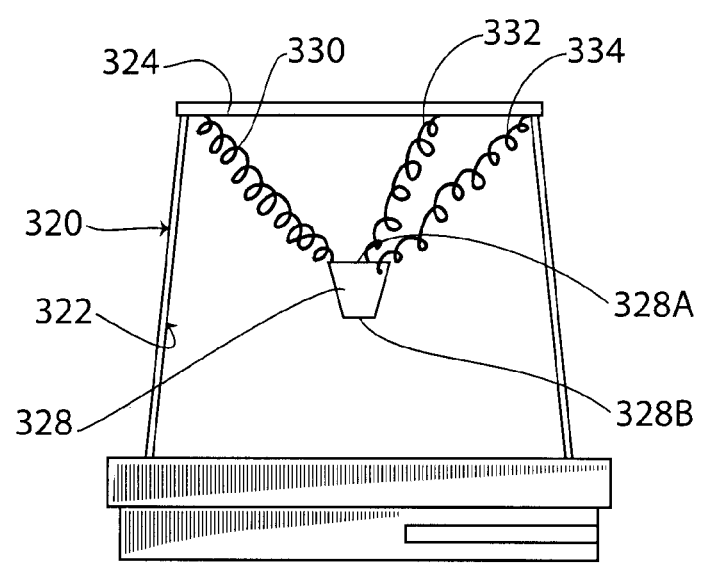
FIG. 14 is an elevational view of the sensor guard embodiment of FIG. 13, with the associated lens mount ring, but with the camera main body removed.

In the last embodiment of the invention illustrated in FIGS. 13-14, sensor guard assembly 320 consists of an open frame 322 defining an annular body 324 integrally supported spacedly over camera ring 32 by a number (e.g. 4 as shown) of transverse support legs 326. A small bottomless conical cup 328 is carried i.e. hung centrally of annular body 324 by a few (e.g. 3 as shown) radially extending elongated coil springs 330, 332, 334, anchored at their radially outward ends to (preferably equidistant) peripherally spaced sections of annular body 324. Bottomless cup 328 includes a diametrally larger top mouth 328A and a diametrally smaller bottom mouth 328B. The diametrally larger top end mouth 328A of conical cup 328 (i.e. facing the plane of annular body 324) is sized and shaped to accommodate and retain the nozzle tip 425 of a bulb blower, thus allowing inward penetration of nozzle tip 425 through bottom mouth 328B into the camera chamber along axial and non-axial directions but against progressively increasing return bias from coil springs 330-334 away from the plane of ring 32.

In one embodiment, the soft plastic coating material around wire 22 (122) is ABS.

The invention claimed is:

1. A cleaning apparatus for removing dust from lens surfaces inside a camera inner chamber of a camera, said cleaning apparatus comprising:
   a) a bulb blower device defining a nozzle having a main body with opposite inlet and outlet tip, said nozzle inlet diametrally larger than said nozzle main body and outlet tip so as to define a seat, a compressible resilient bulb member having an air intake port and an air outlet, and coupling means for coupling said nozzle inlet to said bulb member outlet; and
   b) a retention member, defining a planar annular section, for fitting over a bayonet mount ring from the camera, frusto-conical cup means sized such that said nozzle outlet tip and main body are releasably engaged therethrough but said nozzle inlet seat releasably lockingly abuts thereagainst, and omnidirectional spring loaded connector means spacedly interconnecting said annular section to said cup means, enabling said cup means to move from a first position, at rest spacedly away from a plane of said retention member planar annular section, to a second position within said plane of said retention member annular section;
   wherein said nozzle main body defines a length of such a size that said nozzle outlet tip is progressively movable towards and through and beyond and transversely across the plane of said retention member annular section against a bias of said spring loaded connector means, for enabling said nozzle outlet tip to access progressively further into the camera inner chamber yet sustaining progressively increasing spring back forces.

2. The cleaning apparatus as in claim 1, wherein said spring loaded connector means is an hemispherical shape spring-loaded elastomeric sheet forming an annular edge and defining a spring bias, said annular section integral to said annular edge of said sheet, and said cup means consisting of a selected one through bore from a plurality of through bores made on said elastomeric sheet, said elastomeric sheet partly collapsible under outwardly applied load but automatically returning to a hemispherical shape under bias of said spring bias.

3. The cleaning apparatus as in claim 1, wherein said connector means consists of a semi-flexible spring-loaded wire spiralling into an hemispherical shaped open wire cone, said semi flexible spring loaded wire defining an elbowed inner end at one edge of said wire cone for releasable interlocking with the camera lens bayonet mount ring, said cup means integrally mounted to an apex of said wire cone opposite said one edge thereof.

4. The cleaning apparatus as in claim 3, wherein said cup means consists of one frusto-conical extension of said semi flexible spring loaded wire having two sections: an outer wall having a larger diameter than an inner base.

5. The cleaning apparatus as in claim 1, wherein said connector means comprises: a rigid ring, a number of support legs having one and another opposite ends and fixedly transversely connected at said one end of said support legs to said ring, anchor means for anchoring said another end of said support legs to said camera bayonet mount ring, and at least three spaced spring members having one and another opposite ends with said spring members one end anchored to peripherally spaced sections of said second ring and with said spring members radially inwardly projecting from said second ring, said cup means integral to and joining said spring members another ends.

6. The cleaning apparatus as in claim 5, wherein said cup means is a conical bottomless cup defining a top mouth facing a plane intersecting said ring and a bottom mouth facing a plane intersecting said support legs another ends.

7. The cleaning apparatus as in claim 3, wherein said semi flexible spring loaded wire is coated by a non-conductive soft plastic material sheath of a type enabling prevention of accidental wire short circuiting.

8. A method of use of said camera with the cleaning apparatus of claim 1, comprising the following steps:
   a) turning the camera upside down to bring a rear section of said camera inner chamber facing downwardly;
   b) engaging said nozzle main body through said cup means;
   c) applying forcible biasing pressure on said nozzle inlet seat into said cup means and with concurrent progressive inward displacement of said cup means against said bias of said spring loaded connector means, from said first position to said second position thereof;
   d) bringing said nozzle outlet tip inwardly to such a position closely spacedly registering with a lens section of the camera inner chamber to be cleaned;
   e) compressing said resilient bulb member with concurrent air outflow into said nozzle main body and through and outwardly from said nozzle air outlet; and
   f) releasing said forcible biasing pressure of step c) with concurrent spring back return of said cup means towards said second position thereof.

* * * * *